(12) United States Patent
Saligrama Ananthanarayana et al.

(10) Patent No.: US 10,290,028 B2
(45) Date of Patent: May 14, 2019

(54) COMPUTER IMPLEMENTED SYSTEM FOR MANAGING ADVERTISEMENTS AND A METHOD THEREOF

(71) Applicant: STREAMOID TECHNOLOGIES PRIVATE LIMITED, Bangalore (IN)

(72) Inventors: Rajesh Kumar Saligrama Ananthanarayana, Bengaluru (IN); Rohan Manthani, Fresno, CA (US)

(73) Assignee: STREAMOID TECHNOLOGIES PRIVATE LIMITED, Bangalore (IN)

( * ) Notice: Subject to any disclaimer, the term of this patent is extended or adjusted under 35 U.S.C. 154(b) by 770 days.

(21) Appl. No.: 14/875,703

(22) Filed: Oct. 6, 2015

(65) Prior Publication Data

US 2016/0104212 A1 Apr. 14, 2016

(51) Int. Cl.
*G06F 16/58* (2019.01)
*G06Q 30/02* (2012.01)
*H04L 29/08* (2006.01)
*G06F 16/9535* (2019.01)

(52) U.S. Cl.
CPC ......... *G06Q 30/0276* (2013.01); *G06F 16/58* (2019.01); *G06F 16/5866* (2019.01); *G06F 16/9535* (2019.01); *G06Q 30/0256* (2013.01); *G06Q 30/0277* (2013.01); *H04L 67/20* (2013.01); *H04L 67/02* (2013.01); *H04L 67/06* (2013.01)

(58) Field of Classification Search
CPC .......... G06Q 30/0276; G06Q 30/0256; G06Q 30/0277; G06F 17/30265; G06F 17/30268; G06F 17/30867; H04L 67/20; H04L 67/02; H04L 67/06

USPC ......... 709/224; 725/34; 345/420; 705/14.73, 705/14.72; 370/474; 358/1.15

See application file for complete search history.

(56) References Cited

U.S. PATENT DOCUMENTS

| | | | |
|---|---|---|---|
| 2005/0068576 A1* | 3/2005 | Tonegawa | H04L 29/06 358/1.15 |
| 2006/0031486 A1* | 2/2006 | Miner | G06F 17/30038 709/224 |
| 2006/0179453 A1* | 8/2006 | Kadie | G06Q 30/02 725/34 |
| 2007/0130159 A1* | 6/2007 | Gulli | G06F 17/3084 |

(Continued)

FOREIGN PATENT DOCUMENTS

WO WO-2016160221 A1 * 10/2016 ......... H04N 5/23229

OTHER PUBLICATIONS

Contextual Image Search (Year: 2010).*

*Primary Examiner* — Tarek Elchanti
(74) *Attorney, Agent, or Firm* — Barry Choobin; Patent 360 LLC

(57) ABSTRACT

A computer implemented system and method for management of advertisements is disclosed. The system provides effective and efficient management of advertisements. The system provides for effective collaboration of online advertisements and offline advertisements. The system collects advertisements from online resources as well as offline resources, and subsequently converts offline advertisements into online advertisements based on image processing techniques. Further, the system generates advertisements which encompass an optimum fit into the target website, subsequent to analyzing the layout of the target website to identify the advertisements that best suit the target website.

8 Claims, 3 Drawing Sheets

(56) References Cited

U.S. PATENT DOCUMENTS

| | | | |
|---|---|---|---|
| 2007/0255617 A1* | 11/2007 | Maurone | G06Q 30/02 705/14.73 |
| 2008/0111816 A1* | 5/2008 | Abraham | G06Q 30/06 345/420 |
| 2008/0304518 A1* | 12/2008 | Cheng | H04L 67/20 370/474 |
| 2011/0125591 A1* | 5/2011 | Evans | G06Q 30/02 705/14.72 |

* cited by examiner

COMPUTER IMPLEMENTED SYSTEM FOR MANAGING ADVERTISEMENTS AND A METHOD THEREOF

CROSS REFERENCE TO RELATED APPLICATIONS

This patent application claims the priority of the Indian Provisional Patent Application No. 4382/CHE/2014 filed on Sep. 8, 2014, postdated to Oct. 8, 2014, having the title "A COMPUTER IMPLEMENTED SYSTEM FOR MANAGING ADVERTISEMENTS AND A METHOD THEREOF", and the content of which is incorporated herein by reference in its entirely.

BACKGROUND

Technical Field

The embodiments herein relates to the field of advertising. Particularly, the embodiments herein relates to the field of managing print and digital advertisements. More particularly, the embodiments herein relates to the field of managing advertisements online and offline using analysis and recognition of images.

Description of Related Art

With the advent of information technology, it is common for users, when online, to be exposed to web based advertisements. Typically, a user who is online and visiting a particular web page, gets exposed to the advertisements from the publisher of the web page, given the fact that the user is accessing the web page of the publisher. Further, users are also exposed to the advertisements when they visit any random web page, wherein such advertisements are typically broadcasted by advertisement exchangers (ad exchanges). For example, a fashion ecommerce company can insert targeted Advertisements via digital Ad exchanges into any webpage or App screen visited by the user. Brands target offline users via print Advertisements, Billboard Advertisements or TV Advertisements. There is no direct way of establishing the effectiveness of these Advertisements as there is no immediate feedback while the user is perusing the advertisement. Moreover Brand teams treat and sell print and digital Advertisements in a separate way.

Computer implemented systems are available in prior art, which would create an ad-profile highlighting the choices and preferences of a user (in respect of the products and services preferred by the user), and make use of the ad-profile to generate advertisements which would be served to users on web-sites that they are forecasted to visit. The forecast about the websites visited by users is typically performed by analyzing the choices and preferences of the individual users. Further, the systems of the prior art relied largely upon crating a profile highlighting the choices and preferences of the user, based on which, advertisements would later be generated.

However, the drawbacks of the systems of prior art were that they necessitated creation of a user profile, and further relied upon forecasting techniques to identify the websites that could be visited by the target group of users while ignoring their offline behavior. Therefore, to obviate the drawbacks associated with the prior art systems, the embodiments herein envisages a computer implemented system that provides for collaboration of online advertisements and offline advertisements and also provides for seamless integration of online and offline advertisements.

The above mentioned shortcomings, disadvantages and problems are addressed herein and which will be understood by reading and studying the following specification.

OBJECTS OF THE EMBODIMENTS

An object of the embodiments herein is to provide a computer implemented system that provides effective and efficient management of advertisements.

Yet another object of the embodiments herein is to provide a computer implemented system that provides for effective collaboration of online advertisements and offline advertisements.

Still a further object of the embodiments herein is to provide a computer implemented system that collects advertisements from online resources as well as offline resources.

One more object of the embodiments herein is to provide a computer implemented system that automatically converts offline advertisements into online advertisements based on image processing techniques.

Still a further object of the embodiments herein is to provide a computer implemented system that can track digital Advertisements and Print/Billboard Advertisements in a consolidated fashion.

Still a further object of the embodiments herein is to provide a computer implemented system that generates advertisements which encompass an optimum fit into the target website.

Yet another object of the embodiments herein is to provide a computer implemented system that analyzes the layout of the target website to identify the advertisements that best suit the target website.

These and other objects and advantages of the embodiments herein will become readily apparent from the following detailed description taken in conjunction with the accompanying drawings.

SUMMARY

The embodiments herein envisages a computer implemented system that provides effective and efficient management of advertisements. The system envisaged by the embodiments herein collects advertisements from online resources as well as offline resources and further provides for effective collaboration of online advertisements and offline advertisements. The system further converts automatically offline advertisements into online advertisements based on image processing techniques. Further, the system generates advertisements which encompass an optimum fit into the target website, by analyzing the layout of the target website to identify the advertisements that best suit the target website.

The system in accordance with the embodiments herein comprises an image database and a repository for storing at least the metadata corresponding to the images stored in the image database. The image database, in accordance with the embodiments herein cooperates with a crawler module that crawls online publications including but not restricted to news papers, magazines, news templates and handouts, and subsequently extracts at least advertisements therefrom. Further, the system in accordance with the embodiments herein also enables a user to upload images, typically the images created/customized by the user, on to the image database, via a user interface (not shown in figures). Further, the user interface also enables the user to add additional information to the images which were previously uploaded by him.

In accordance with the embodiments herein, the image database further cooperates with a internet enabled device which preferably is configured to function as a File Transfer Protocol (FTP) client to at least receive, preferably Extensible Markup Language (XML) files incorporating the information corresponding to the advertisements published in offline publications. In accordance with the embodiments herein, the advertisements extracted by the crawler module, and the XML files corresponding to the advertisements published offline are digitally stored in the image database.

In accordance with the embodiments herein, the system further comprises a matching engine. The matching engine cooperates with the image database and the repository, to access the images stored on the image database and to access the corresponding metadata stored in the repository.

In accordance with the embodiments herein, when the user captures an image, preferably an off-line image using an image capturing device (not shown in figures), an extractor cooperating with the handheld device/internet enabled device of the user, extracts the contextual information corresponding to the captured image (typically offline image), including but not restricted to the layout of the captured image, fonts used in the captured image, and color characteristics of the captured image.

Subsequently, the extractor transmits the extracted contextual information to the matching engine, which analyzes the contextual information and further searches the image database and the repository, preferably simultaneously, to derive the advertisements (and the metadata thereof) that closely match the offline image captured by the user. The matching engine derives at least the advertisements matching the offline image captured by the user, subsequent to comparing the parameters of the captured image with the parameters corresponding to the advertisements stored in the image database based upon at least the pattern of the image, edges in the image, curves, orientation, lighting, scale, rotation, contrast, corners on the image.

In accordance with the embodiments herein, subsequent to the analysis of contextual information and the searching of the image database and the repository, the matching engine elicits at least one advertisement from the image database which closely matches the parameters of the offline image captured by the user, and the elicited image is pushed onto the user's internet enabled device via a communication network. Preferably, when the user clicks on the offline image, the user is redirected to an online page that accommodates the native online advertisement, and the relevant advertisement(s) elicited by the matching engine are preferably transmitted, preferably in the form of banner advertisements to the online page, to which the user has been redirected.

In accordance with the embodiments herein, the matching engine is configured to perform an analysis of the advertisements stored as images in the image database, and further modify at least a part of the advertisement, for example, the background color of the advertisement, at least some of the fonts of the advertisement, and the like in order to enhance the appeal and aesthetics of the advertisements. Typically, the matching engine undertakes the aforementioned modifications dynamically when an advertisement needs to be elicited in response to the user capturing an offline image. Alternately, the matching engine can also perform an analysis of all the advertisements stored in the image database, in order to suggest appropriate modifications to at least a part of the advertisements. Preferably, the matching engine analyzes the advertisements stored in the image database, based upon the characteristics and parameters associated with a target webpage or an internet enabled mobile application, to which the elicited advertisement is to be pushed.

In accordance with the embodiments herein, the matching engine is further configured to compare the advertisement (stored as images in the image database), and the image(s) captured/accessed by the user, and generate a 'fit rating' which is indicative of the probability that a particular advertisement from the image database that is relevant, at least in terms of the content, to the image captured/accessed by the user. The fit rating is also generated based upon whether the advertisements are feasible to a target webpage or internet enabled mobile application to which the user would be redirected subsequent to him capturing an image. The matching engine, in accordance with the embodiments herein preferably analyzes the color similarity pattern similarity and similarity in terms of the layouts of the advertisements as well as the target web page, before eliciting at least one advertisement as being suitable for the webpage.

The embodiments herein envisages a method for managing advertisements. The method, in accordance with the embodiments herein comprises the following steps: Crawling a plurality of online publications for advertisements, receiving information corresponding to advertisements published offline, extracting, in the form of images, the advertisements from the online publications, storing the extracted advertisements in the form of images in an image database, storing the metadata corresponding to the images, in a repository, tracking the user activity on an internet enabled device, extracting contextual information corresponding to an image captured by the user, comparing the contextual information with the metadata corresponding to the images stored in the image database, eliciting at least one advertisement matching the contextual information, from the image database, pushing the advertisement onto the internet enabled device of the user.

In accordance with the embodiments herein, the method further includes the step of performing an analysis of the advertisements stored as images in the image database, and modifying at least a part of the advertisements, to render the advertisement (images) suitable for display on a target webpage (internet enabled device).

In accordance with the embodiments herein, the method further includes the step of comparing the advertisements stored as images in the image database, and the image(s) on a target web page, and generating a 'fit rating' indicative of the probability that a particular advertisement from the image database seamlessly fits the target web page.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the, spirit thereof, and the embodiments herein include all such modifications.

BRIEF DESCRIPTION OF THE DRAWINGS

The other objects, features and advantages will occur to those skilled in the art from the following description of the preferred embodiments inter-alia and the accompanying drawings in which.

Although the specific features of the embodiments herein are shown in some drawings and not in others. This is done for convenience only as each feature may be combined with any or all of the other features in accordance with the embodiments herein.

DETAILED DESCRIPTION OF THE EMBODIMENTS

To obviate the drawbacks specified in the background section, the embodiments herein envisages a computer implemented system for managing advertisements. The embodiments herein envisages a computer implemented system that provides effective and efficient management of advertisements. The system envisaged by the embodiments herein collects advertisements from online resources as well as offline resources and further provides for effective collaboration of online advertisements and offline advertisements.

The system further converts offline advertisements into online advertisements based on image processing techniques. Further, the system generates advertisements which encompass an optimum fit into the target website, by analyzing the layout of the target website to identify the advertisements that best suit the target website.

Figure 1:
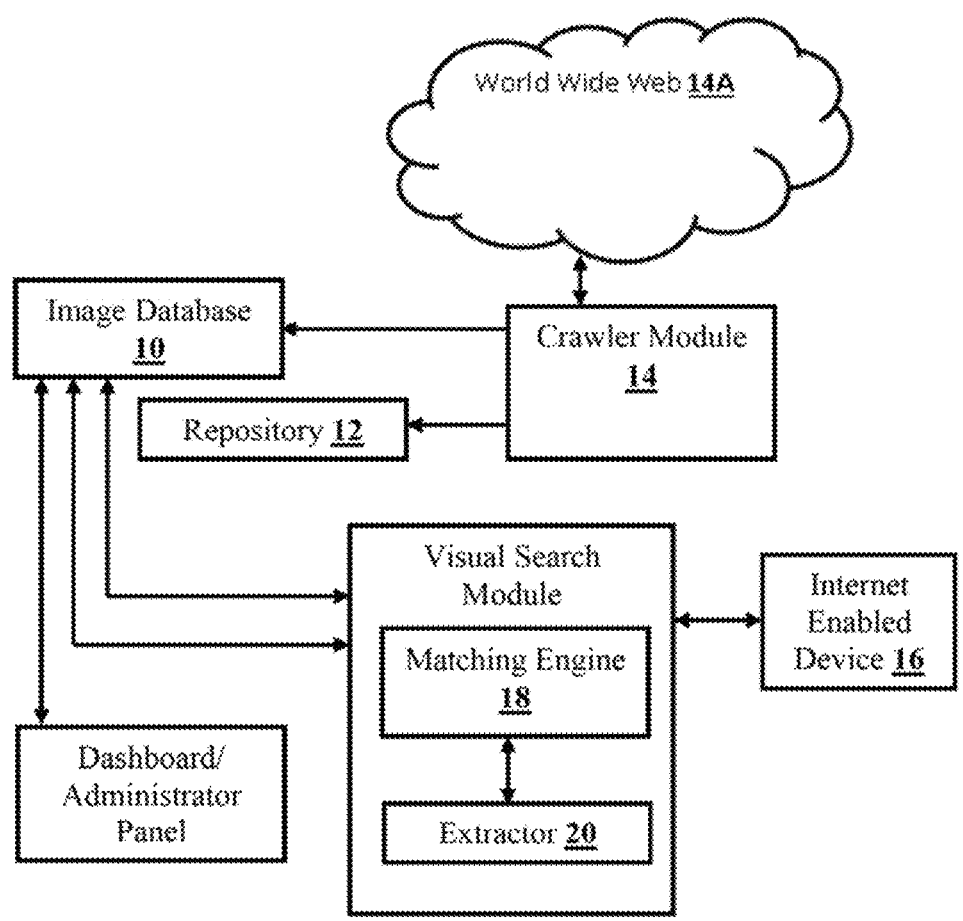
FIG. 1 is a block diagram corresponding to the computer implemented system for managing advertisements, in accordance with the embodiments herein.

Referring to FIG. 1, there is shown a block diagram of the computer implemented system 100 for managing advertisements. The system 100, in accordance with the embodiments herein comprises an image database denoted by reference numeral 10, and a repository 12 for storing at least the metadata corresponding to the images stored in the image database 10.

The image database 10, in accordance with the embodiments herein cooperates with a crawler module 14 that crawls online publications including but not restricted to news papers, magazines, news templates and handouts, and subsequently extracts at least advertisements therefrom. Further, the system 100, in accordance with the embodiments herein also enables a user to upload images, typically the images created/customized by the user, on to the image database 10, via a user interface (not shown in figures). Further, the user interface also enables the user to add additional information to the images which were previously uploaded by him.

In accordance with the embodiments herein, the image database 10 further cooperates with a computerized device (not shown in figures) which is configured to function as a File Transfer Protocol (FTP) client to at least receive, preferably Extensible Markup Language (XML) files incorporating the information corresponding to the advertisements published in offline publications. In accordance with the embodiments herein, the advertisements extracted by the crawler module 14, and the XML files corresponding to the advertisements published offline are digitally stored in the image database 10.

In accordance with the embodiments herein, the system 100 further comprises a matching engine represented by reference numeral 18. The matching engine 18 cooperates with the image database 10 and the repository 12, to access the images stored on the image database 10 and to access the corresponding metadata stored in the repository 12.

In accordance with the embodiments herein, when the user captures an image, preferably an offline image, an extractor 20 cooperating with the handheld device/internet enabled device of the user, extracts the contextual information corresponding to the (offline) image captured by the user, including but not restricted to the layout of the captured image, fonts used in the captured image, and color characteristics of the captured image.

Subsequently, the extractor 20 transmits the extracted contextual information to the matching engine 18, which analyzes the contextual information and further searches the image database 10 and the repository 12, preferably simultaneously to derive the advertisements (and the metadata thereof) that closely match the offline image captured by the user. The matching engine 18 derives at least the advertisements matching the image captured by the user, subsequent to comparing the parameters of the captured image with the parameters corresponding to the advertisements stored in the image database 10 based upon at least the pattern of the captured) image, edges in the image, curves, orientation, lighting, scale, rotation, contrast, corners on the image.

In accordance with the embodiments herein, subsequent to the analysis of contextual information and the searching of the image database 10 and the repository 12, the matching engine 18 elicits at least one advertisement from the image database 10, which best matches the parameters of the image captured by the user, and the elicited image is pushed onto the user's internet enabled device 16 via a communication network. Preferably, when the user captures an the offline image, the user is redirected to an online page that accommodates the native online advertisement, and the relevant advertisement(s) elicited by the matching engine are preferably transmitted, preferably in the form of banner advertisements to the online page, to which the user has been redirected.

In accordance with the embodiments herein, the matching engine 18 is further configured to perform an analysis of the advertisements stored as images in the image database 10, and further modify at least a part of the advertisement, for example, the background color of the advertisement, some of the fonts of the advertisement, and the like in order to enhance the appeal and aesthetics of the advertisements. Typically, the matching engine 18 undertakes the aforementioned modifications dynamically when an advertisement needs to be elicited in response to the user clicking/hovering upon an offline image. Alternately, the matching 18 can also perform an analysis of all the advertisements stored in the image database 10, in order to suggest appropriate modifications to at least a part of the advertisements. Preferably, the matching engine analyzes the advertisements stored in the image database 10, based upon the characteristics and parameters associated with a target webpage.

In accordance with the embodiments herein, the matching engine 18 is further configured to compare the advertisement (stored as images in the image database 10), and the image(s) accessed/captured by the user, and generate a 'fit rating' which is indicative of the probability that a particular advertisement from the image database 10 that is relevant, at least in terms of the content, to the image captured by the user. The fit rating is also generated based upon whether the advertisements are feasible to a target webpage to which the user would be redirected subsequent to him clicking upon the image. The matching engine 18, in accordance with the embodiments herein preferably analyzes the color similarity pattern similarity and similarity in terms of the layouts of the advertisements as well as the target web page, before eliciting at least one advertisement as being suitable for the webpage.

Figure 2:
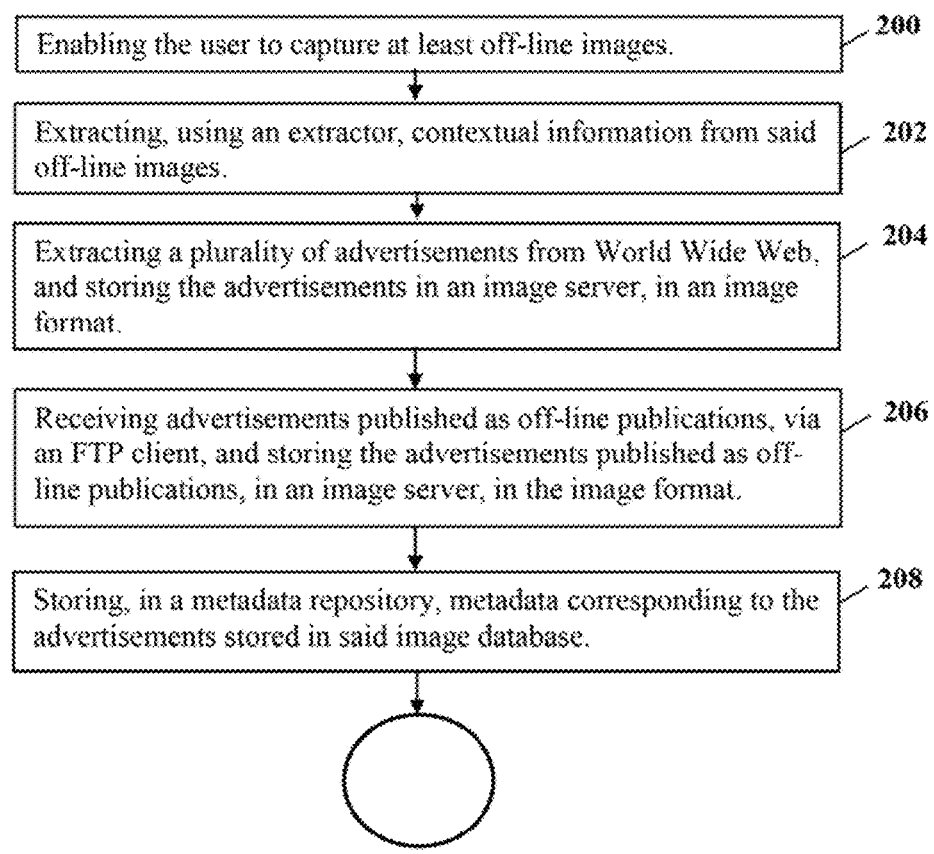
FIGS. 2 and 2A, in combination is a flow chart illustrating the steps involved in the computer implemented method for managing advertisements, in accordance with the embodiments herein.
Figure 2A:
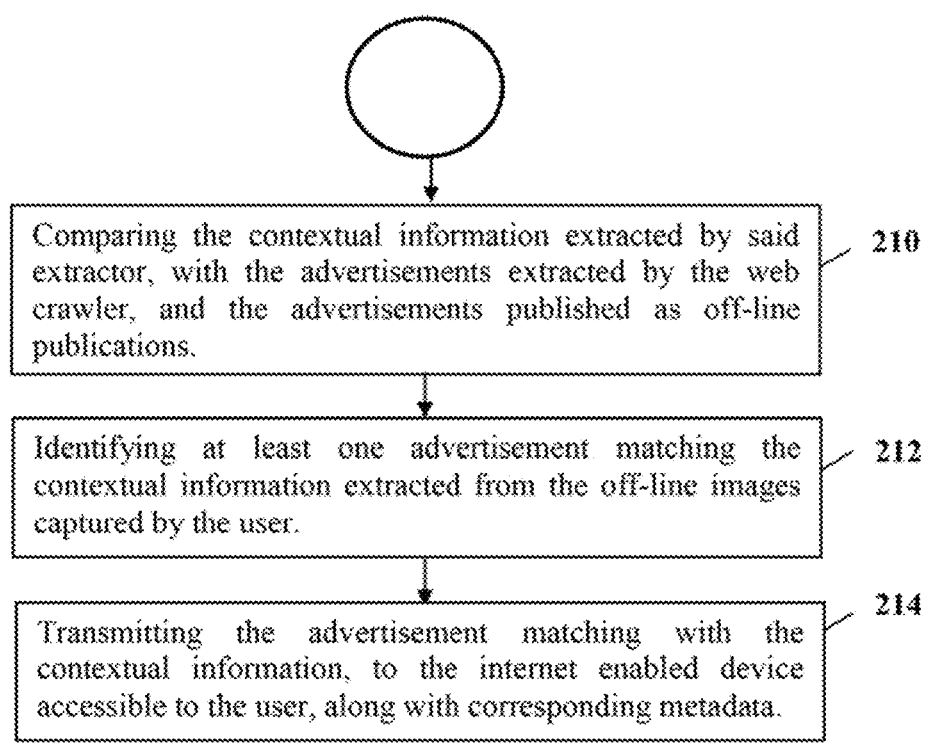

Referring to FIG. 2 and FIG. 2A in combination, there is shown a flow chart illustrating the steps involved in the method for managing advertisements. The method, in accordance with the embodiments herein comprises the following steps: enabling the user to capture at least off-line images (200); extracting, using an extractor, contextual information from said off-line images (202); extracting a plurality of advertisements from World Wide Web, via a web server, and storing the advertisements in an image server, in an image format (204); receiving advertisements published as off-line publications, via an FTP (File Transfer Protocol) client, and storing the advertisements published as off-line publications, in an image server, in the image format (206); storing, in a metadata repository, metadata corresponding to the advertisements stored in said image database (208); comparing the contextual information extracted by said extractor, with the advertisements extracted by the web crawler, and the advertisements published, as off-line publications (210); identifying at least one advertisement matching the contextual information extracted from the off-line images captured by the user (212); and transmitting the advertisement matching with the contextual information, to the internet enabled device accessible to the user, along with corresponding metadata (214).

In accordance with the embodiments herein, the method further includes the step of performing an analysis of the advertisements stored as images in the image database, and modifying at least a part of the advertisements, to render the advertisement suitable for display on a target webpage.

In accordance with the embodiments herein, the method further includes the step of comparing the advertisements stored as images in the image database, and the image(s) on a target web page, and generating a 'fit rating' indicative of the probability that a particular advertisement from the image database seamlessly fits the target web page.

The technical advantages envisaged by the embodiments herein include the realization of a computer implemented system that provides effective and efficient management of advertisements. The system envisaged by the embodiments herein provides for effective collaboration of online advertisements and offline advertisements.

Further, the system envisaged by the embodiments herein collects advertisements from online resources as well as offline resources, and subsequently converts offline advertisements into online advertisements based on image processing techniques. Further, the system of the embodiments herein generates advertisements which encompass an optimum fit into the target website. The system analyzes the layout of the target website to identify the advertisements that best suit the target website.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims.

Although the embodiments herein are described with various specific embodiments, it will be obvious for a person skilled in the art to practice the invention with modifications. However, all such modifications are deemed to be within the scope of the claims.

It is also to be understood that the following claims are intended to cover all of the generic and specific features of the embodiments described herein and all the statements of the scope of the embodiments which as a to matter of language might be said to fall there between.

What is claimed is:

1. A computer implemented system for managing advertisements rendered accessible to a user, said system comprising:
    an internet enabled device accessible to said user, said internet enabled device configured to enable said user to capture offline images;
    a processor cooperating with said internet enabled device to receive said offline images, said processor configured to:
        process said offline images and extract contextual information from said offline images, said processor further configured to determine a pattern of said offline images, an edges present within said offline images, curves present within said offline images, corners present within said offline images, an orientation, a contrast, a scale and a lighting of said offline images;
        access World Wide Web and extract at least a plurality of advertisements therefrom;
        trigger an image database to store said extracted advertisements in an image format;
        trigger said image database to cooperate with an FTP (File Transfer Protocol) client, and extract using said FTP client, said extracted advertisements published as offline publications, and further trigger said image database to process said offline publications and store said offline publications in said image format;
        process said offline publications, said extracted advertisements and said contextual information corresponding to said offline images, and generate metadata corresponding to said offline publications, said extracted advertisements and said contextual information;
        trigger a metadata repository to store said metadata therein;
    said processor further configured to compare said contextual information corresponding to said offline images with said extracted advertisements and said offline publications, based at least on the pattern of said offline images, the edges present within said offline images, the curves present within said offline images, the corners present within said offline images, the orientation, the contrast, the scale and the lighting of said offline images, to identify at least one advertisement matching said contextual information corresponding to said offline images;
    said processor further configured to transmit the at least one advertisement matching with the contextual information, along with said metadata, to the internet enabled device accessible to the user.

2. The system as claimed in claim 1, wherein said contextual information is selected from a group consisting of layout of said offline images, fronts used in the offline image, and color characteristics of the offline images.

3. The system as claimed in claim 1, wherein said system further includes a user interface accessible via said internet enabled device, said user interface configured to enable said user to upload self-created images and customized images.

4. The system as claimed in claim 1, wherein said extracted advertisements published as said offline publications are received and stored by the image database, in the format of XML (Extensible Markup Language) data files.

5. The system as claimed in claim 1, wherein said at least one advertisement matching the contextual information, is displayed in the image format, on the internet enabled device accessible to the user.

6. The system as claimed in claim 1, wherein said processor is further configured to selectively process the extracted advertisements stored in the image database, and modify at least a part of the extracted advertisements including a background color of said extracted advertisements, and fonts of said extracted advertisements.

7. A computer implemented method for managing advertisements rendered accessible to a user, said method comprising computer implemented steps comprising:

enabling said user to capture said offline images using an internet enabled device which is accessible to said user;

receiving, using a processor cooperating with said internet enabled device, processing, using said processor, said offline images and extract contextual information from said offline images;

determining, using said processor, a pattern of said offline images, an edges present within said offline images, curves present within said offline images, corners present within said offline images, an orientation, a contrast, a scale and a lighting of said offline images;

accessing World Wide Web and extract at least a plurality of advertisements therefrom;

triggering an image database to store said extracted advertisements in an image format;

triggering said image database to cooperate with an FTP (File Transfer Protocol) client, and extracting using said FTP client, said extracted advertisements published as offline publications, and further triggering said image database to process said offline publications and store said offline publications in said image format;

processing said offline publications, said extracted advertisements and said contextual information corresponding to said offline images, and generating metadata corresponding to said offline publications, said extracted advertisements and said contextual information;

triggering a metadata repository to store said metadata therein;

comparing, using said processor, said contextual information corresponding to said offline images with said extracted advertisements and said offline publications, based at least on the pattern of said offline images, the edges present within said offline images, the curves present within said offline images, the corners present within said offline images, the orientation, the contrast, the scale and the lighting of said offline images, to identify at least one advertisement matching said contextual information corresponding to said offline images;

transmitting, using said processor, the at least one advertisement matching with the contextual information, along with said metadata, to the internet enabled device accessible to the user.

8. The method as claimed in claim 7, wherein the method further includes selectively processing the extracted advertisements stored in the image database, and modifying at least a part of the extracted advertisements including a background color of the extracted advertisements, and fonts of the extracted advertisements.

* * * * *